T. F. GLENN.
ARTIFICIAL TOOTH.
APPLICATION FILED AUG. 2, 1915.

1,210,460.

Patented Jan. 2, 1917.

Inventor
Thomas F. Glenn,
By
Clifton C. Caldwell
Attorney

Witnesses
Edward F. Simpson, Jr.
William J. Russell

UNITED STATES PATENT OFFICE.

THOMAS F. GLENN, OF ARDMORE, PENNSYLVANIA.

ARTIFICIAL TOOTH.

1,210,460.  Specification of Letters Patent.  Patented Jan. 2, 1917.

Application filed August 2, 1915. Serial No. 43,068.

*To all whom it may concern:*

Be it known that I, THOMAS F. GLENN, a citizen of the United States, and a resident of Ardmore, in the county of Montgomery, State of Pennsylvania, have invented certain new and useful Improvements in Artificial Teeth, whereof the following is a specification, reference being had to the accompanying drawings.

My invention relates particularly to the formation of the labial surface of artificial teeth whereby they are caused to closely resemble natural teeth when in use.

It has long been evident that the smooth and glossy nature of glazed, vitrified porcelain produces reflected light, whose brilliancy is greatly increased in an artificial tooth by the saliva of the mouth, which tends to greatly emphasize the artificial nature of such a tooth. Attempts have been made to overcome this objectionable characteristic of porcelain teeth by providing the labial surface of teeth with means to subdue the reflected light, so that when moistened by the saliva of the mouth they will more nearly resemble the natural teeth. Various formations of tooth surface have been introduced to produce the desired illusion, with varying degrees of success. Such formations may be traced back to the early introduction of artificial teeth.

It is the object of my invention to produce an artificial tooth having its surface so formed that it will accurately and undetectably imitate natural teeth.

My invention comprehends an artificial tooth having its surface provided with a plurality of facets extending in relatively angular planes.

My invention also includes all of the various novel features of construction and arrangement hereinafter more definitely specified.

Figure 1:
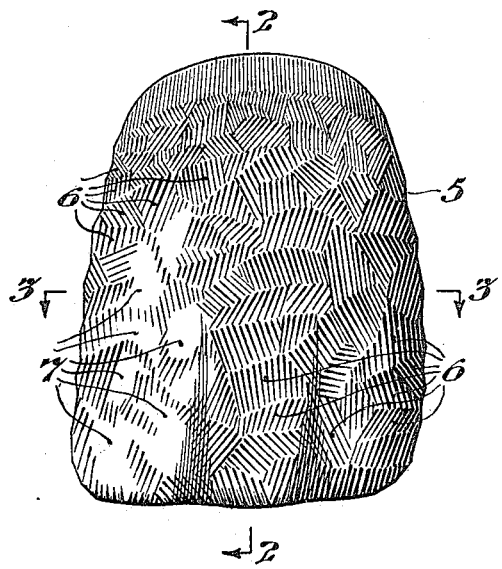
Figure 2:
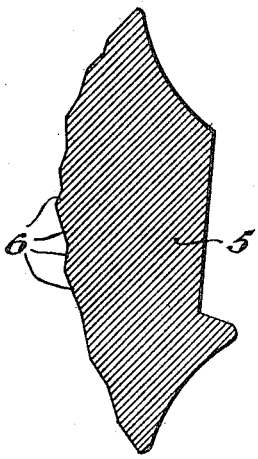
Figure 3:
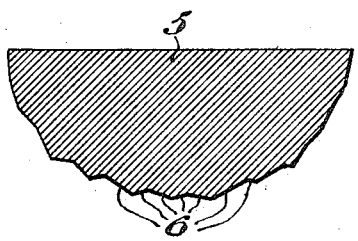

In the accompanying drawings, Figure 1 is a front elevational view of a tooth conveniently constructed in accordance with my invention; Fig. 2 is a central longitudinal sectional view of the tooth shown in Fig. 1, taken on the line 2—2 in said figure; and Fig. 3 is a transverse sectional view of the tooth shown in Fig. 1, taken on the line 3—3 in said figure. In each of said views the tooth is shown greatly enlarged.

In said figures, I have chosen to illustrate my invention as applied to a left central incisor, which it is to be understood is typical of the different forms of teeth of the dental arch to which it may be applied.

The tooth body 5, which may be of any desired configuration, has its labial surface formed of irregularly disposed facets 6, of varying contour and dimensions, which may merge into the adjacent facets, and which serve to localize the high lights 7 reflected by the glazed faceted surface of the tooth, as shown toward the left side of Fig. 1, it being noted that a comparatively small number of the facets 6 will be disposed at such an angle as to be visibly reflective at the same time to produce the high lights 7.

It is not the purpose of my invention to subdue the glossy appearance of the tooth surface, as has been heretofore proposed, but, on the contrary, I prefer to localize the high lights and thereby in effect subdue the surrounding surface.

Although the tooth shown in the drawings depicts its labial surface as being of generally regular outline, save for the facets 6, which are characteristic of my invention, it is to be understood that said facets may be employed in connection with a tooth having any of the well known characteristic humps, depressions, ridges, grooves, etc., which are common in tooth formation. Furthermore, although I have shown in Fig. 1 a tooth having facets which are generally of substantially equal area, it is to be understood that the variation of said facets is unlimited. For instance, the facets at the incisive edge of the tooth may be relatively large, while the facets at the gingival end of the tooth comparatively small, with a gradual reduction of their size from the incisive edge toward the gingival end; or, the tooth may have portions which are free from the facets, and said facets may be disposed thereon in positions varying as may be desired.

I do not desire to limit my invention to the precise details of construction and arrangement as herein set forth, as it is obvious that various modifications may be made therein without departing from the essential features of my invention as defined in the appended claims.

Having thus described my invention, I claim:

1. As an article of manufacture, an artificial tooth having its labial surface formed of a plurality of facets, arranged to localize the high lights and thereby in effect subdue the surrounding surface.

2. As an article of manufacture, an artificial tooth having its labial surface formed of a plurality of irregular facets, arranged to localize the high lights and thereby in effect subdue the surrounding surface.

In witness whereof, I have hereunto set my hand this 30th day of July, A. D., 1915.

THOMAS F. GLENN.

Witnesses:
WILLIAM J. RUSSELL,
EDWARD F. SIMPSON, Jr.

Copies of this patent may be obtained for five cents each, by addressing the "Commissioner of Patents, Washington, D. C."